(12) United States Patent
Polosky et al.

(10) Patent No.: US 6,453,746 B1
(45) Date of Patent: Sep. 24, 2002

(54) MICROSCALE ACCELERATION HISTORY DISCRIMINATORS

(75) Inventors: Marc A. Polosky; David W. Plummer, both of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 128 days.

(21) Appl. No.: 09/590,086

(22) Filed: Jun. 7, 2000

(51) Int. Cl.⁷ .................................................. G01P 3/18
(52) U.S. Cl. ....................................................... 73/530
(58) Field of Search ............................ 3/514.14, 514.16, 3/514.26, 514.38, 526, 527, 528, 529, 530, 531, 532, 1.42, 1.56; 702/187

(56) References Cited

U.S. PATENT DOCUMENTS 2,641,457 A * 6/1953 Carleton ..................... 73/514.6
2,653,019 A * 9/1953 Dreisbach ................... 73/514.6
4,825,697 A * 5/1989 Huber ....................... 73/514.14
5,239,866 A * 8/1993 Froidevaux ................... 73/526

FOREIGN PATENT DOCUMENTS

JP          11-151831     *   6/1999

* cited by examiner

Primary Examiner—Helen Kwok
(74) Attorney, Agent, or Firm—Brian W. Dodson (57) ABSTRACT

A new class of micromechanical acceleration history discriminators is claimed. These discriminators allow the precise differentiation of a wide range of acceleration-time histories, thereby allowing adaptive events to be triggered in response to the severity (or lack thereof) of an external environment. Such devices have applications in airbag activation, and other safety and surety applications.

28 Claims, 6 Drawing Sheets

MICROSCALE ACCELERATION HISTORY DISCRIMINATORS

GOVERNMENT RIGHTS

This invention was made with Government support under Contract DE-AC04-94AL85000 awarded by the U.S. Department of Energy. The Government has certain rights in the invention.

FIELD OF THE INVENTION

The present invention relates generally to devices to discriminate between competing modes of acceleration, and more particularly to micromechanical devices therefor.

BACKGROUND OF THE INVENTION

There are numerous circumstances in which a certain action is to be taken if and only if a particular acceleration-time history is experienced. Perhaps the most common such circumstance involves the decision to trigger the inflation of an air bag in a moving vehicle.

It is now clear that undesired air bag inflation is an event often associated with serious injury of direct and indirect origin. As a result, whereas it is important that an air bag inflate properly when conditions require (i.e., during a crash), it is perhaps more important that it not inflate under non-threatening acceleration exposures, such as driving over a curb, or panic braking. In fact, safety statistics suggest that it is safer if air bags do not inflate in minor collisions.

To address this problem, it is first necessary to properly characterize the loading pattern associated with serious automobile crashes. For the purposes of this specification such details are not important, as the devices described herein have broader applicability. However, it is not difficult to understand that different types of collisions and other loading events will have quite different signatures. Dropping a wheel in a pothole will have an acceleration limited by the response rate of the shock absorbers. A fender bender will exhibit little more acceleration than an abrupt stop. A more serious collision, however, will show accelerations associated with the strength of the automobile's crumple zones and the relative velocity of the collision. Such accelerations, sustained for a period indicating a serious collision, should trigger the airbags. Otherwise, one is safer to depend on passive safety equipment. Similar considerations apply to transverse loading, as in side collisions.

However, simple and reliable sensors for a combined acceleration-time profile are few and far between. It is relatively easy to provide a sensor which will not produce a signal until a certain acceleration threshold is passed, but to include the additional requirement that the acceleration continue for at least a minimum length of time has required electronic circuitry to integrate sensor measurements, or complex and tricky hydraulic damping mechanisms to postpone sensor operation.

There is thus a need for a simple, robust, and reliable mechanism for discrimination of combined acceleration-time exposures. We address this need through introduction of a new type of micromechanical acceleration sensor.

SUMMARY OF THE INVENTION

The invention is of an acceleration history discriminator, in which a sense mass shuttle responds to external acceleration by moving as directed by a shuttle motion guide. The speed at which the sense mass shuttle moves is limited by a motion damper, which controls the shuttle speed to a level roughly proportional to the applied acceleration. When exposed to a predetermined acceleration-time history, these discriminators can produce a simple or coded signal which can direct a useful action, such as triggering an automotive airbag.

DETAILED DESCRIPTION

The instant invention is of a new class of mechanical devices called acceleration history discriminators. These devices provide a characteristic signal after having been subjected to a particular acceleration-time history. The interest is in micromechanism implementations, such as might be implemented using MEMS (microelectromechanical systems) or LIGA fabrication techniques. If MEMS fabrication is used, the structural materials will comprise silicon, polysilicon, silicon oxide, silicon nitride, and/or silicon oxynitride. If LIGA fabrication is used, the structural materials will comprise metals and ceramics.

The microscale acceleration history discriminators (MAHDs) made according to the instant invention will typically be smaller than 5 centimeters in the largest linear dimension. Such devices are not only much smaller, but are also cheaper than discriminators which might be implemented on a larger size scale. Significant design choices and limitations result from the size scales involved. Many varied implementations are possible, and are described in the appended claims.

Figure 1A:
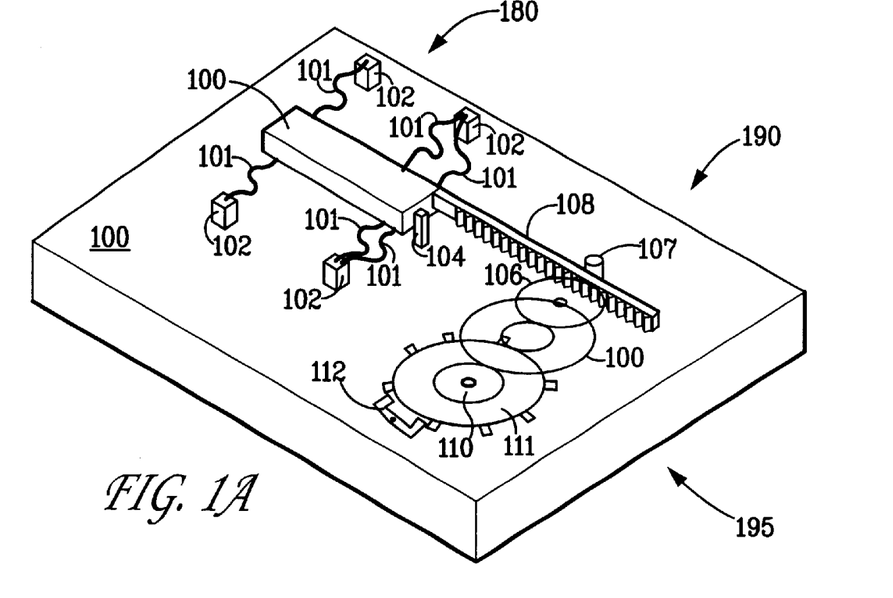
FIGS. 1a–1c. Schematic illustration of an implementation of a microcale acceleration history discriminator (MAHD).

A particular implementation will form the basis for most of the detailed description of MAHDs. This implementation in its simplest form is presented in FIG. 1. Here sense mass shuttle 100 is a rectilinear slab, which when various fabrication technologies are used can comprise silicon, metal, or can be a composite of several parts.

Shuttle 100 is suspended above substrate 103 on shuttle motion guide 180, which comprises suspension springs 101, which are attached to shuttle 100 and to substrate 103 via anchor points 102. The suspension springs are so arranged as to permit relatively easy motion along a chosen axis of shuttle 100 (in this case the long axis), while making motion and tilt in other directions more difficult. The shuttle motion guide thereby restricts shuttle 100 to substantially unilinear motion in response to external acceleration. This restriction is not required to obtain a functional MAHD, as devices designed to discriminate multiaxis acceleration-time histories can be made.

Figure 1B:
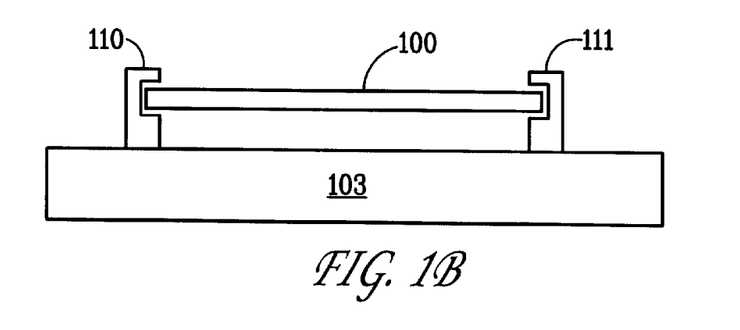
Figure 1C:
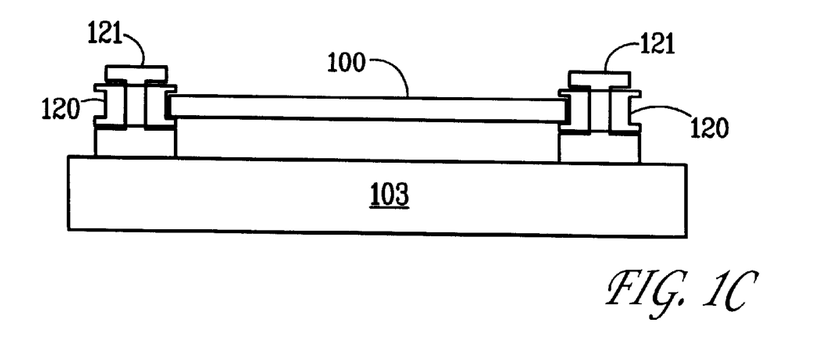

Note that shuttle 100 can also constrained to easy uniaxial motion by mounting it on sliding or rolling guide elements. These structures are illustrated in FIGS. 1b and 1c respectively. FIG. 1b shows a shuttle 100 mounted above substrate 103 on a pair of sliding guide elements 110 and 111. These sliding guide elements provide a pair of grooves within which the shuttle is placed. The dimensions allow the shuttle to slide freely within the sliding guide elements.

FIG. 1c shows a shuttle 100 mounted above substrate 103 by a set of rolling guide elements 120. Rolling guide elements 120 are disks with grooves on their periphery within which the shuttle mounts. The guide elements are mounted on posts 121 about which they are free to rotate. The result is that the shuttle can move along the axis of the rolling guide elements quite freely, and with little friction, but are essentially fixed in other directions. This can be particularly useful if the goal is to detect a small acceleration in a particular direction in the presence of large accelerations oriented in other directions.

It is usually desirable that shuttle 100 not move until the applied acceleration exceeds a predetermined value. This can be satisfied by introducing preloading springs 104, which act to push shuttle 100 against stop 105 with a known force. The force of acceleration on shuttle 100 must then exceed this known force before the shuttle can move. A similar effect can be produced by prestressing suspension springs 101 to push shuttle 100 against stop 105.

The force of acceleration acting on shuttle 100 must now be converted into a constant shuttle velocity by acceleration-velocity converter 190. In this implementation, acceleration-velocity converter 190 comprises toothed rack 106, which engages the first gear 108 of transmission 195, and whose motion is restrained by the mutual action of first gear 108 and of rack guide 107. In this implementation first gear 108 also engages the small portion of compound gear 109. The large portion of compound gear 109 then engages pawl wheel gear 110, atop of which is located pawl wheel 111.

Pawl wheel ill rotates rapidly if unconstrained when shuttle 100 moves in response to applied acceleration. That is, in this implementation transmission 195 is a step-up transmission. Pawl wheel 111 engages pawl 112, in a manner similar to that of an escapement in a mechanical clock. The interaction of the pawl and the pawl wheel, which is described in detail below, dramatically slows the rate at which the pawl wheel rotates, and hence also slows the rate at which shuttle 100 can move in response to an applied acceleration. The net effect is that the shuttle moves at a constant average velocity which is roughly proportional to the applied acceleration.

Figure 2A:
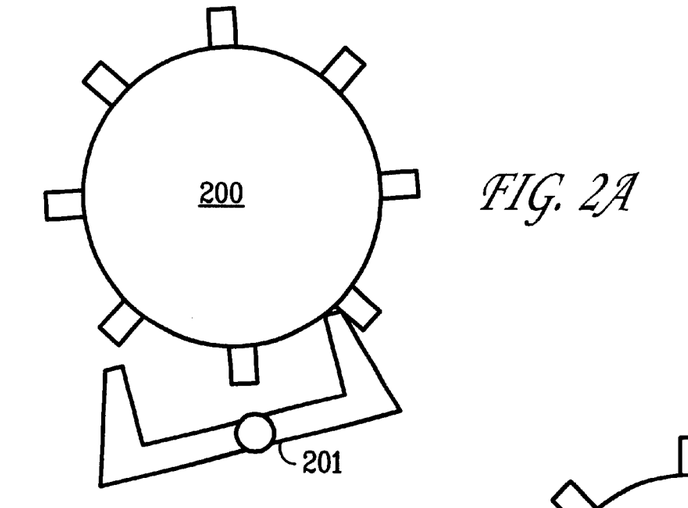
FIGS. 2a–2c. Illustration of the action of a pawl and pawl wheel.
Figure 2B:
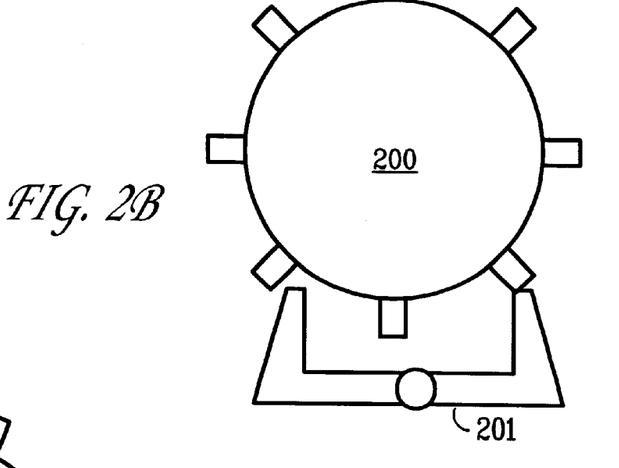

The interaction of pawl 112 and pawl wheel 111 is illustrated in FIG. 2. The pawl wheel 200 is being rotated in a clockwise direction by an external mechanism (not shown). In FIG. 2a, the right arm of pawl 201 has just been hit by a first tooth of pawl wheel 200. As a result of the obstruction of the motion of said tooth, the rotation of pawl wheel 200 is momentarily halted. Also as a result of the interaction of said tooth with the right arm of pawl 201, the pawl begins to rotate in a clockwise direction. Eventually this motion allows said tooth to slip past the right arm of the pawl, so that rotation is again allowed, as shown in FIG. 2b. However, at this point the left arm of pawl 201 now obstructs the motion of a second tooth just clockwise of the first tooth.

Figure 2C:
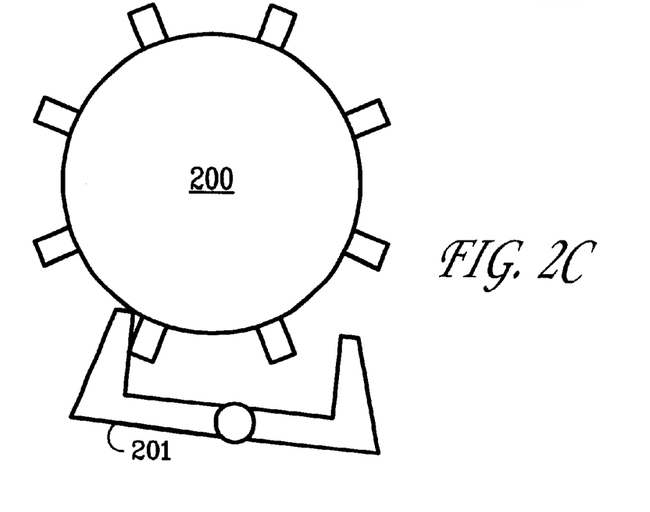

When the second tooth hits the left arm of pawl 201, as shown in FIG. 2c, the clockwise motion of the pawl wheel is again halted, and the pawl begins to rotate, but this time in a counterclockwise direction. When the pawl has rotated far enough to allow the second tooth to pass, the mechanism is again in the configuration shown in FIG. 2a. This cycle continues so long as linear motion of shuttle 100 continues, and the shuttle motion is dramatically slowed thereby.

There would appear to be other approaches to providing this function of acceleration-velocity conversion, including frictional devices and hydraulic devices. Such devices, however, are problematic when applied to micro-sized devices. Stiction between components can approach the strength of solid materials, while the friction between moving components can easily be reduced by trapped gases or other fluids. Hydraulic devices are limited by the enormous effects of surface tension on the micro size scale. Although a macroscopic hydraulic device can convert force into velocity, a micro-scale device is more likely, owing to surface tension effects, to convert a force into a fixed displacement distance. Accordingly, a suitable acceleration-velocity converter for a MAHD will take the form of a mechanism.

There are many potential applications for MAHDs, some of which are purely mechanical in nature. However, in most cases one will wish to generate an electrical or optical signal to use to control another activity. The simplest case is the generation of a simple yes-no signal which switches when the shuttle has traveled a prescribed distance. This type of MAHD differentiates between an sudden sharp acceleration, a sustained very mild acceleration (particularly if the MAHD shuttle is preloaded), and an acceleration-time history which will produce the prescribed amount of shuttle displacement.

Figure 3A:
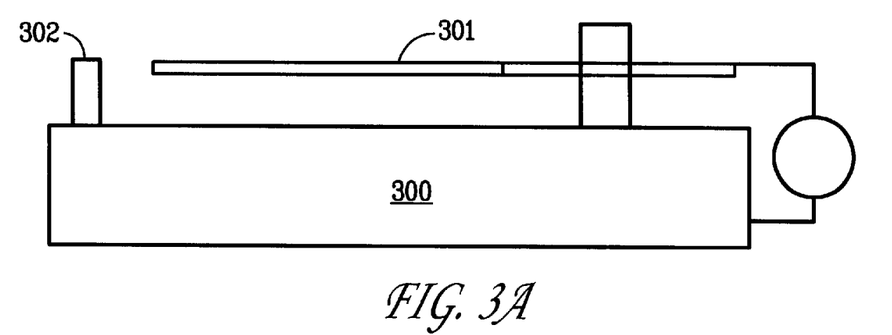
FIGS. 3a–3b. Schematic illustration of an MAHD with electrical signaling and latching mechanisms.
Figure 3B:
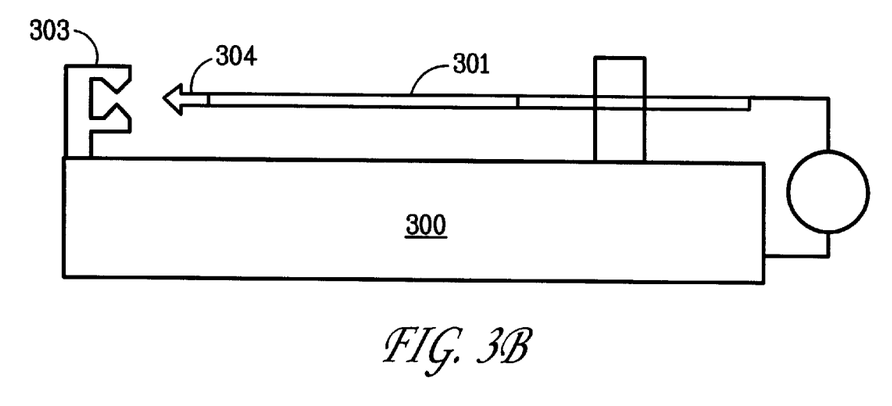

An electrical signal can be generated as shown in FIG. 3a, where the shuttle 301, which is now electrically insulated from substrate 300, runs into contact post 302 as it moves along. When contact is made, an electrical circuit is completed, which circuit can generate a control signal. A useful variation on this simple mechanism is shown in FIG. 3b, where the contact post 302 is replaced by a mechanical latching mechanism 303, which grips and holds latch pin 304 (mounted on shuttle 301) when the shuttle has moved the prescribed distance. Such latching mechanisms are useful not only as indicated above, but also can be used to insure that a MAHD does not produce signals after a suitable acceleration-time history has been encountered.

An optical signal can also be generated as shown in FIG. 4. FIG. 4a shows a MAHD 490, comprising a substrate 400, spring suspension 401, shuttle 402, and motion damper 403. Also shown are optical source 404 (which may be a fiber optic to a remote light source, an LED, a laser diode, . . . ), and optical detector 405 (which can be a fiber optic to a remote detector, an optoelectronic device, . . . ). Source 404 and detector 405 are so positioned and oriented that when the shuttle moves, thereby bringing reflective spot 406 to the point where the centers of the source and the detector intersect. Reflective spot 406 then reflects the output of source 404 into detector 405, thereby generating a simple signal that that amount of shuttle travel has occurred. This assumes that the relevant surface of the shuttle is non-reflective.

Alternate optical approaches abound, and are summarized in FIG. 4. FIG. 4b shows the situation where the relevant surface of shuttle 402 is here reflective, and the signal is now generated, with opposite polarity, by non-reflecting spot 407. The same principle appears in FIG. 4c, where the absorbing spot is replaced by introduction of an aperture 408 through shuttle 402, thereby preventing the light from reflecting to the detector when the aperture reaches the intersecting optical axes.

Figure 4A:
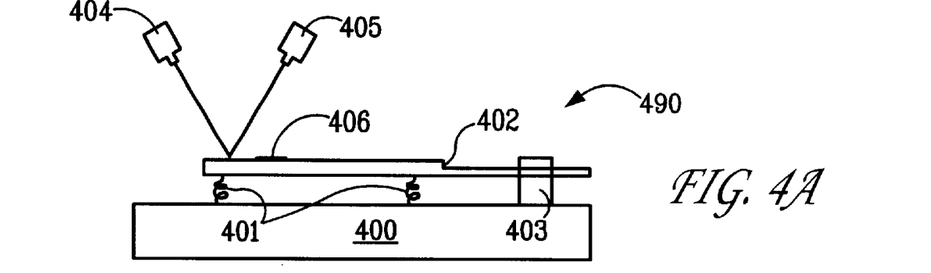
FIGS. 4a–4d. Schematic illustration of various optical signal generation schemes for MAHD.
Figure 4B:
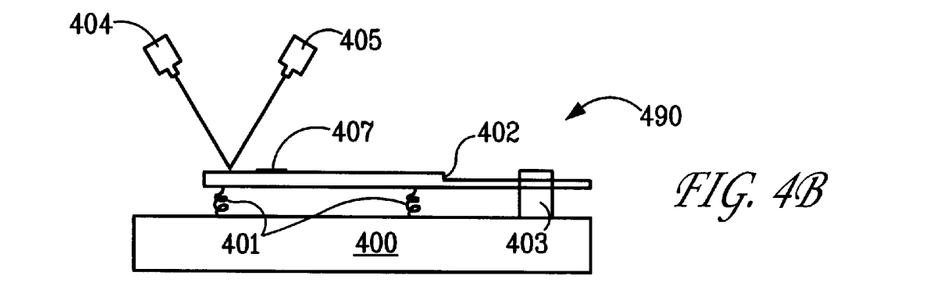
Figure 4C:
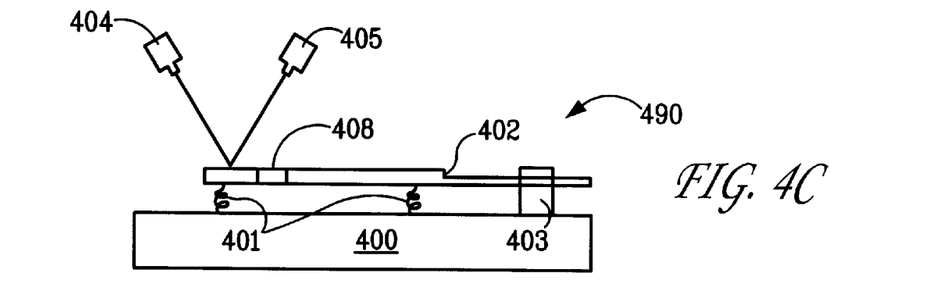
Figure 4D:
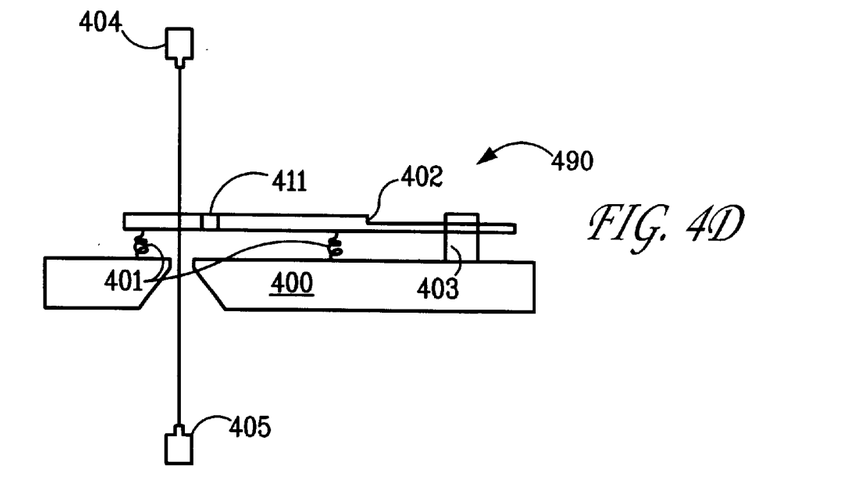

FIG. 4d shows a different variation. Here source 404, detector 405, and substrate hole 410 are aligned, but the source and detector are on opposite sides of shuttle 402. A signal is generated when shuttle aperture 411 becomes aligned with the source, detector, and hole.

Figure 5A:
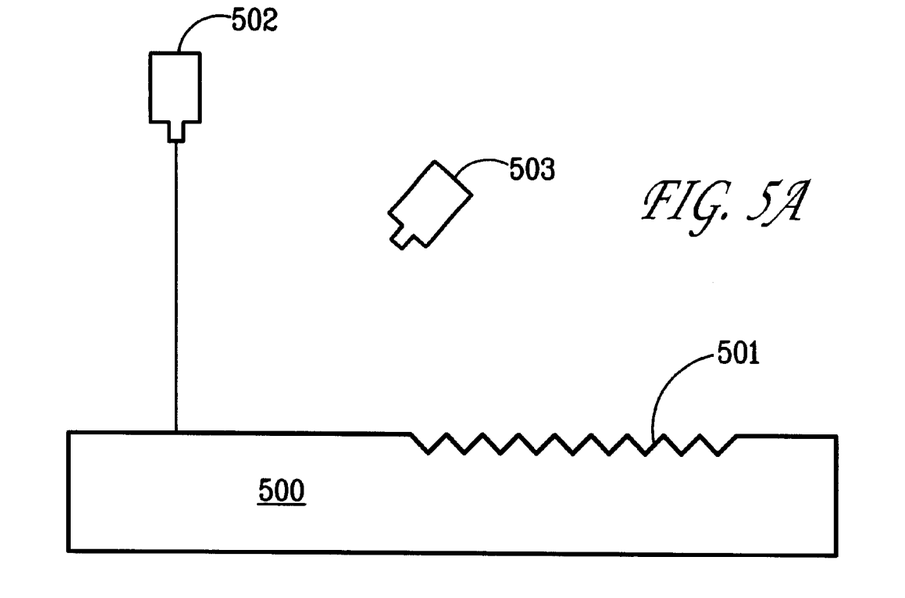
FIGS. 5a–5b. Schematic illustration of the structure and function of an optical backscatter structure.

A variation on this approach to optical signal generation is called a backscatter structure, and is shown in FIG. 5. FIG. 5a shows a shuttle 500 with a backscatter structure 501 fabricated at its top surface. A backscatter structure is simply a faceted structure with a reflective surface. An optical source 502 is directed perpendicularly at the top surface of shuttle 500, but on a region away from the backscatter structure. The optical output of source 502 is thus reflected back toward source 502, and little if any of the output reaches optical detector 503, which is offset and directed at the region where the optical output strikes the surface of the shuttle.

Figure 5B:
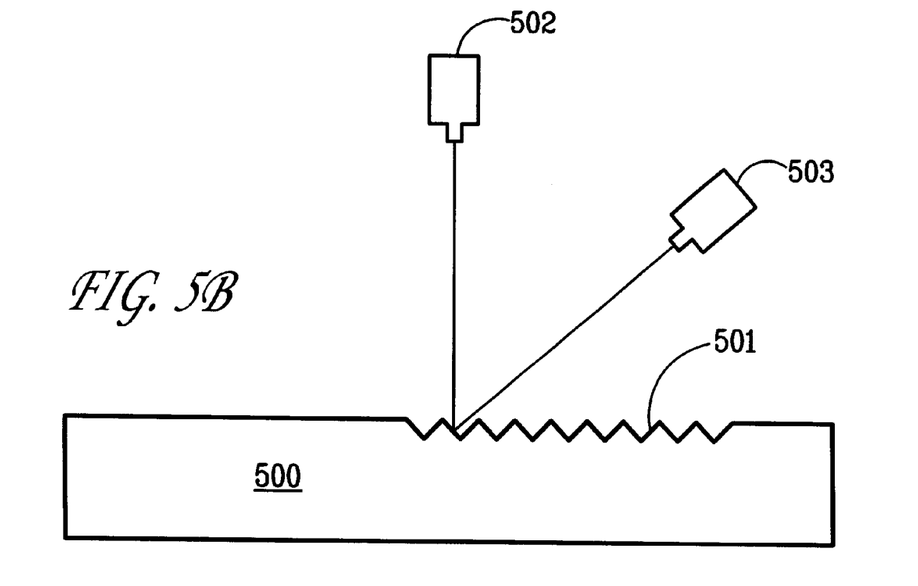

FIG. 5b shows the case where the optical source is directed at backscatter structure 501 as a result of relative motion of the elements. Here the optical signal from source 502 is reflected from the facets of the backscatter structure, and part of the signal is thereby directed into optical detector 503, thereby generating a signal. Such a backscatter structure can be substituted for the reflecting spot 406 in FIG. 4a, or for the nonreflecting spot 407 in FIG. 4b.

In the above, optical signals have been discussed in the context of electrical signals generated from the optical signals by use of an optical detector. However, in some cases the optical signal alone can be used, e.g., to trigger an activity. In such cases a detector is not needed.

All of the above implementations produce a simple indication that the shuttle has traveled a prescribed distance. However, a wide array of very different acceleration time histories can produce the desired displacement. An acceleration which barely moves the shuttle will, if sustained, eventually produce a signal from the MAHD. (This is one reason for preloading the shuttle of an MAHD.) But an acceleration which is much larger, but only applied for a short time, will also produce a signal. For that matter, an oscillating acceleration whose average is biased away from zero acceleration can eventually produce a signal. The above MAHDs are hence for rather crude discrimination, but do suffice for some applications.

A simple approach to improve the discrimination potential of an MAHD is to generate a pair of simple signals as the shuttle moves. Perhaps the simplest approach is to add to any of the earlier MAHD implementations an electrical circuit between an insulated shuttle and the substrate through the mechanical contact between the shuttle and stop 105 of FIG. 1. This MAHD now produces (at least) two signals, one when the shuttle starts to move, thereby opening the aforementioned electrical circuit, and one when the shuttle reaches a prescribed amount of displacement.

This arrangement offers several advantages over the previous implementations. The main one is that a definite time interval can be measured between the shuttle move signal and the shuttle displacement signal. This time interval allows the rejection of the vast majority of the acceleration-time histories which are able to produce sufficient shuttle displacement to generate the shuttle displacement signal.

Additionally, the MAHD can now detect accelerations which are not large enough to produce the shuttle displacement signal, but which are large enough to overcome the shuttle preloading. If many such events are detected which do not result in generating the shuttle displacement signal, that is, if the shuttle moves and returns to its original position many times before generating the shuttle displacement signal, this can be used as an indication that the operating environment is sufficiently hostile that a revised trigger criterion must be used—for example, that the acceptable time interval between the two signals be reduced, thereby requiring a higher peak acceleration before the MAHD can generate an external signal.

The above MAHD implementation can easily be adapted to the situation where both signals are electrical, or where both signals are optical. A minor variation has the early signal not generated at the first motion of the shuttle, but after some distance less than that which will generate the shuttle displacement signal has been traveled. Obvious combinations of the signaling submechanisms described earlier will serve these purposes.

The cost of this type of implementation is a modest increase in mechanical and optical complexity, combined with the need for "intelligent" signal comparison electronics. These comparison electronics can range in complexity from being able to compare an elapsed time to a target time, to being able to determine if a coded sequence is accurate and is generated in the right length of time, but all are straightforward electronic design problems.

Figure 6:
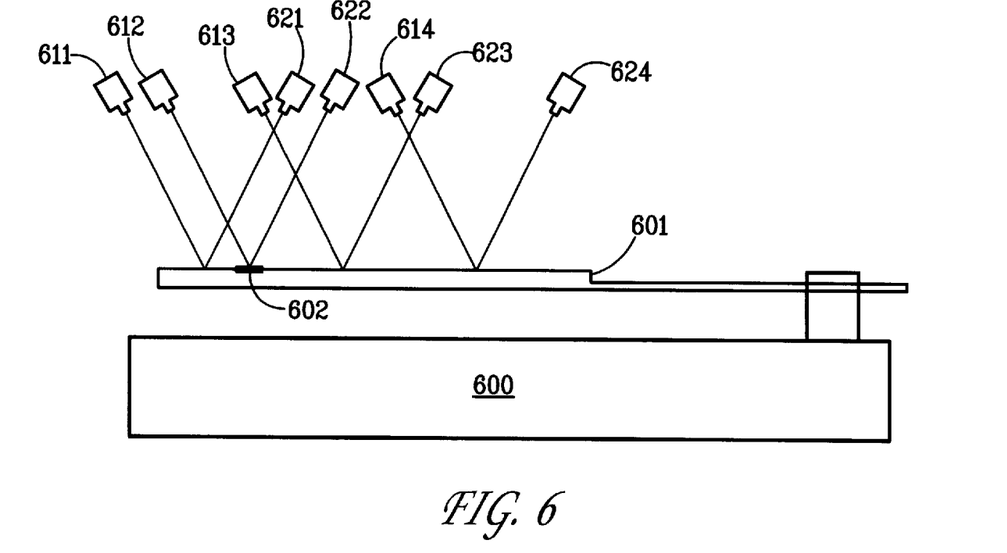
FIG. 6. Schematic illustration of a multiple source-detector pair implementation of an MAHD.

Clearly, an MAHD can be designed with still higher levels of acceleration-time history discrimination by increasing the number of known shuttle positions which generate optical signals. However, if this is accomplished as shown in FIG. 6, with a discrete pair of optical sources and detectors (611–621, 612–622, 613–623, and 614–624) for each shuttle 601 position to be reported, and all optical outputs are generated through the action of a single reflective spot 602, the device complexity soon becomes intractable, particularly in microscale devices as are being claimed here. Obtaining sufficient spatial resolution can also become difficult.

To avoid this problem when high levels of spatial resolution between multiple shuttle position signals is required, a pattern of signal regions can be fabricated on the shuttle.

Figure 7:
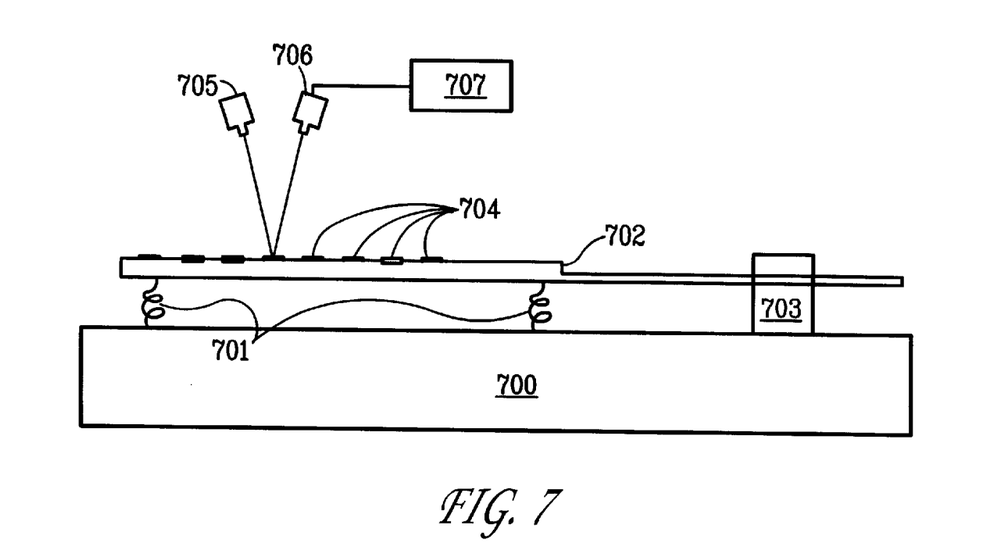
FIG. 7. Schematic illustration of an MAHD having a coded pattern of reflective spots on the shuttle.

A simple example would be a uniform pattern of reflecting bars, as shown in FIG. 7. (Note that non-reflecting bars, or backscatter structures, could also be used in this context as described earlier.) Shuttle 702 is suspended above substrate 700 by the action of suspension springs 701. The motion of shuttle 702 is controlled by the action of acceleration-velocity converter 703. A pattern of reflecting bars 704 is fabricated atop shuttle 702. For simplicity of illustration this pattern is here chosen to be of uniform width bars separated by a uniform distance, but neither condition is required to obtain a usable MAHD.

Optical source 705 and optical detector 706 are aligned and positioned so that an optical signal is generated when one of the reflective bars 704 passes through the region where the axes of the source and detector intersect. When the shuttle is subjected to the desired level of acceleration for a sufficient period, the motion of shuttle 702 takes the reflective bars 704 through the optical signal generator assembly at a largely constant velocity, thereby producing, via the signal comparison electronics 707 a signal output comprising a periodic rectangular wave whose frequency is proportional to the acceleration being applied.

A nonuniform distribution of reflective bars 704 can be By used, either to produce a simple signal when exposed to a complex acceleration-time history, or to produce a complex, but characteristic, signal which is unlikely to be reproduced by periodic artifacts generated within or externally to the MAHD. More complex distributions of reflective bars can be used to reduce further the acceleration-time histories which can ultimately trigger an output from the MAHD, and the signal comparison electronics can be given tighter and tighter requirements for pattern match, but it is not possible to limit the acceleration-time histories which will produce an MAHD signal to one precise condition. This is not a limitation in practical use, where applying such a precise condition would not be possible.

The above has concentrated on MAHD implementations in which the MAHD, either intrinsically or through the use of signal comparison electronics, ultimately generates a simple signal which indicates that a suitable acceleration-time history has been encountered. An additional level of surity can be obtained if output is taken from a lower level, e.g., the output of the optical detector, and that output is considered to be an output code. This output code combines pulses of various relative lengths, and an overall output time.

Assume for a moment that a code of 10 relative durations is encoded into the reflective bars (or equivalent structures) atop the shuttle. To obtain operation, an operational code has to be input into a set of sequence comparing electronics. When the MAHD generates a series of ten pulses within a time period which might indicate a suitable acceleration-time history was encountered, the code represented by the duration and separation of those ten pulses is compared to the operational code previously entered. If the output code and the operational code are the same, within appropriate tolerances, then an output is generated. Otherwise the applied acceleration is ignored. This type of MAHD is perhaps the most secure, as operation of the equipment controlled by the MAHD requires not only exposure to the required acceleration-time history, but also knowledge of the operational code.

The specific implementations of the instant invention described above were chosen for purposes of illustrating general features of the structure and function of said invention. Their presentation was not intended to limit the scope of this invention, which is defined by the claims appended hereto.

What is claimed is:

1. A microscale acceleration history discriminator, comprising:
   a) a sense mass shuttle comprising a shuttle motion indicator;
   b) a shuttle motion guide; and,
   c) an acceleration-velocity converter functionally connected to the sense mass shuttle.

2. The discriminator of claim 1, wherein the sense mass shuttle consists essentially of materials chosen from the group consisting of silicon, silicon oxide, silicon nitride, and combinations thereof.

3. The discriminator of claim 2, wherein the sense mass shuttle is fabricated using lithographic techniques.

4. The discriminator of claim 1, wherein the sense mass shuttle is fabricated using LIGA techniques.

5. The discriminator of claim 1, wherein the sense mass shuttle comprises a carrier and a mass element.

6. The discriminator of claim 5, wherein the mass element comprises a metal.

7. The discriminator of claim 1, wherein the sense mass shuttle is preloaded against an acceleration to be evaluated.

8. The discriminator of claim 7, further comprising at least one preloading spring.

9. The discriminator of claim 1, wherein the shuttle motion guide comprises a spring suspension system.

10. The discriminator of claim 9, wherein the spring suspension system is preloaded against an acceleration to be evaluated.

11. The discriminator of claim 1, wherein the shuttle motion guide comprises at least one sliding guide element.

12. The discriminator of claim 1, wherein the shuttle motion guide comprises at least one rolling guide element.

13. The discriminator of claim 1, wherein the acceleration-velocity converter comprises a mechanical escapement.

14. The discriminator of claim 1, wherein the shuttle motion indicator comprises an optical signal director.

15. The discriminator of claim 14, wherein the optical signal director comprises a reflecting region which moves with the sense mass shuttle.

16. The discriminator of claim 15, wherein said reflecting region consists essentially of a flat silicon surface.

17. The discriminator of claim 15, wherein the reflecting region surrounds a substantially non-reflecting zone.

18. The discriminator of claim 17, wherein said substantially non-reflecting zone comprises an aperture through the sense mass shuttle.

19. The discriminator of claim 17, wherein said substantially non-reflecting zone comprises a transparent window in the sense mass shuttle.

20. The discriminator of claim 17, wherein said substantially non-reflecting zone comprises a optical absorber.

21. The discriminator of claim 14, wherein the optical signal director comprises an optical backscatter structure moving with the sense mass shuttle.

22. The discriminator of claim 14, wherein the optical signal director comprises substructures which encode an action code.

23. The discriminator of claim 14, wherein the optical signal director comprises substructures which encode a timing code.

24. The discriminator of claim 1, further comprising an extreme extension latch.

25. The discriminator of claim 24, wherein activation of the extreme extension latch connects an electrical circuit.

26. The discriminator of claim 14, further comprising an optical signal detection system comprising:
   a) an optical source whose output is directed onto the optical signal director; and,
   b) an optical detector positioned so as to receive the output of the optical source as directed by the optical signal director.

27. The discriminator of claim 26, wherein the optical signal detection system further comprises signal comparison electronics.

28. The discriminator of claim 27, wherein the signal comparison electronics comprise sequence comparing electronics.

* * * * *